United States Patent
Chang et al.

(10) Patent No.: US 8,194,979 B2
(45) Date of Patent: Jun. 5, 2012

(54) METHOD OF CORRECTING FALSE-COLOR PIXEL IN DIGITAL IMAGE

(75) Inventors: Yin-Pin Chang, Taipei (TW);
Hong-Long Chou, Taipei (TW);
Yu-Chen Huang, Jhudong Township, Hsinchu County (TW)

(73) Assignee: Altek Corporation, Hsinchu (TW)

( * ) Notice: Subject to any disclaimer, the term of this patent is extended or adjusted under 35 U.S.C. 154(b) by 819 days.

(21) Appl. No.: 12/344,326

(22) Filed: Dec. 26, 2008

(65) Prior Publication Data
US 2009/0169103 A1    Jul. 2, 2009

(30) Foreign Application Priority Data
Dec. 26, 2007 (TW) ................. 96150369 A

(51) Int. Cl.
*G06K 9/00* (2006.01)
*G06K 9/40* (2006.01)

(52) U.S. Cl. .............. 382/167; 382/162; 382/274

(58) Field of Classification Search .......... 382/274, 382/167
See application file for complete search history.

(56) References Cited

U.S. PATENT DOCUMENTS

| | | | | |
|---|---|---|---|---|
| 6,058,208 A * | 5/2000 | Ikeda et al. | | 382/167 |
| 7,327,876 B2 * | 2/2008 | Hoshuyama | | 382/167 |
| 7,619,641 B2 * | 11/2009 | Shih et al. | | 345/694 |
| 7,728,886 B2 * | 6/2010 | Ogawa | | 348/231.6 |
| 7,733,391 B2 * | 6/2010 | Nikkanen et al. | | 348/246 |
| 2002/0171663 A1 * | 11/2002 | Kobayashi et al. | | 345/600 |
| 2003/0053689 A1 * | 3/2003 | Watanabe et al. | | 382/167 |
| 2004/0028271 A1 * | 2/2004 | Pollard et al. | | 382/162 |
| 2004/0071462 A1 * | 4/2004 | Gindele et al. | | 396/311 |
| 2006/0077466 A1 * | 4/2006 | Ishii et al. | | 358/3.03 |
| 2006/0098253 A1 * | 5/2006 | Masuno et al. | | 358/518 |
| 2006/0209323 A1 * | 9/2006 | Sawada | | 358/1.9 |
| 2008/0181495 A1 * | 7/2008 | Spampinato et al. | | 382/167 |
| 2009/0002545 A1 * | 1/2009 | Heinonen et al. | | 348/370 |
| 2010/0073523 A1 * | 3/2010 | Utsugi | | 348/242 |

* cited by examiner

*Primary Examiner* — Michelle Entezari
(74) *Attorney, Agent, or Firm* — Rabin & Berdo, P.C.

(57) ABSTRACT

A method of correcting a false-color pixel in a digital image is used to correct a false-color pixel generated after being processed by a color correction matrix (CCM). The method includes the following steps. Obtaining a raw image, for being processed by the CCM operation to generate a processed image; comparing pixels of the raw image with that of the processed image according to a color difference ratio, to find out a false-color pixel in the pixels of the processed image; then, performing a color correction on the false-color pixel at the corresponding position of the raw image and the processed image. The false-color pixel is corrected according to the pixel color at the corresponding position of the raw image.

8 Claims, 7 Drawing Sheets

| Pixel Value of Raw Image / Pixel Value of Processed Image | 1 | 2 | ............ | 255 |
|---|---|---|---|---|
| 1 | | | | |
| 2 | | | | |
| ⋮ | | | ↓ (m,n) | |
| 255 | | | | |

METHOD OF CORRECTING FALSE-COLOR PIXEL IN DIGITAL IMAGE

CROSS-REFERENCE TO RELATED APPLICATIONS

This non-provisional application claims priority under 35 U.S.C. §119(a) on Patent Application No(s). 096150369 filed in Taiwan, R.O.C. on Dec. 26, 2007 the entire contents of which are hereby incorporated by reference.

BACKGROUND OF THE INVENTION

1. Field of the Invention

The present invention relates to a digital image processing method, and more particularly to a method of correcting color of a false-color pixel in a digital image.

2. Related Art

Color recognition with human eye is based on a principle that the human eye has three different sensing units for light rays, and different sensing units have different response curves for lights at different wave bands, and the color sensation is achieved through the composite effect of the brain. Generally, we can commonly understand the color decomposition and composite through the RGB three primary color concept.

The working principle of a photosensitive element for a digital camera is not completely the same as the response of the human eye for the RGB lights. The response of the photosensitive element for the spectrum is slightly different from the response of human eye for the spectrum on each component of the RGB light, so definitely, the correction is required. Not only the crossing effect, but also the response strength for each color component must be corrected. The common method is to perform color correction once through a color correction matrix (briefly referred to as CCM below).

The CCM processing flow can be obtained with reference to FIG. 1. Firstly, a group of CCM is set (Step S110). The CCM may be a group of 3*3 pixel matrix or 4*3 pixel matrix, in which the size of the pixel matrix is determined according to a set processing algorithm. The CCM is respectively used in the digital image, such that the CCM is respectively and non-overlappingly used in the digital image (Step S120). Referring to Equation 1, it is a CCM equation.

$$\begin{bmatrix} R' \\ G' \\ B' \end{bmatrix} = \begin{bmatrix} CCM_{11} & CCM_{12} & CCM_{13} \\ CCM_{21} & CCM_{22} & CCM_{23} \\ CCM_{31} & CCM_{32} & CCM_{33} \end{bmatrix} * \begin{bmatrix} R \\ G \\ B \end{bmatrix} \quad \text{Equation 1}$$

R is a red pixel, G is a green pixel, and B is a blue pixel, $CCM_{mn}$ are respectively color correcting parameters, in which m is at the position of the row, and n is at the position of the column, R' is the red pixel after color correction, G' is the green pixel after color correction, and B' is the blue pixel after color correction. Referring to FIGS. 2a and 2b, they are respectively schematic views of a digital image after being processed by CCM. In a raw image 200 in FIG. 2a, each small block represents a pixel 220. A CCM 210 is a dashed-line block, which is assumed that it has a 3*3 pixel size. In FIG. 2b, as for the raw image 200, each pixel 220 is further divided into three pixels with different colors, namely, a red pixel 221, a green pixel 222, and a blue pixel 223. Finally, according to the above operation results, FIG. 2c is a schematic view of a pixel value after the color correction in the conventional art. In a processed image 300, an oblique-line block is a false-color pixel 230. However, after the color correction is performed on the digital image, although the color saturation of the processed image 300 is improved, color spots or color blocks that do not exist in the original actual scene may be generated in the detailed part of the image.

In the conventional art, the false color is eliminated through a Gaussian filter, low-pass filer or other methods. However, in such filter methods, the eliminating motion is performed on all the pixels of the digital image, and although the false color can be eliminated, the color bias of other pixels may be caused accordingly.

SUMMARY OF THE INVENTION

In view of the above problems, the present invention is mainly directed to a color correction method of a color corresponding to a false-color pixel of a digital image, which is capable of performing the correcting process on the false-color pixel in the digital image.

In order to achieve the above objective, the present invention provides a method of correcting a false-color pixel in a digital image, which includes the following steps: obtaining a raw image, for being processed by a CCM operation to generate a processed image; comparing pixels of the raw image with that of the processed image according to a color difference ratio, so as to find out a false-color pixel in the pixels of the processed image; and performing the color correction on the false-color pixel at the corresponding position of the raw image and the processed image.

The present invention provides a correction process on the false-color pixel of the digital image, for performing a false-color pixel correction on the digital image with false-color pixels after being processed by the CCM. The false-color pixel is corrected according to the pixel color at the corresponding position of the raw image. After the correction, the color of the pixel can be further similar to the pixel color of the raw image, without affecting the colors of the other pixels for the digital image.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1:
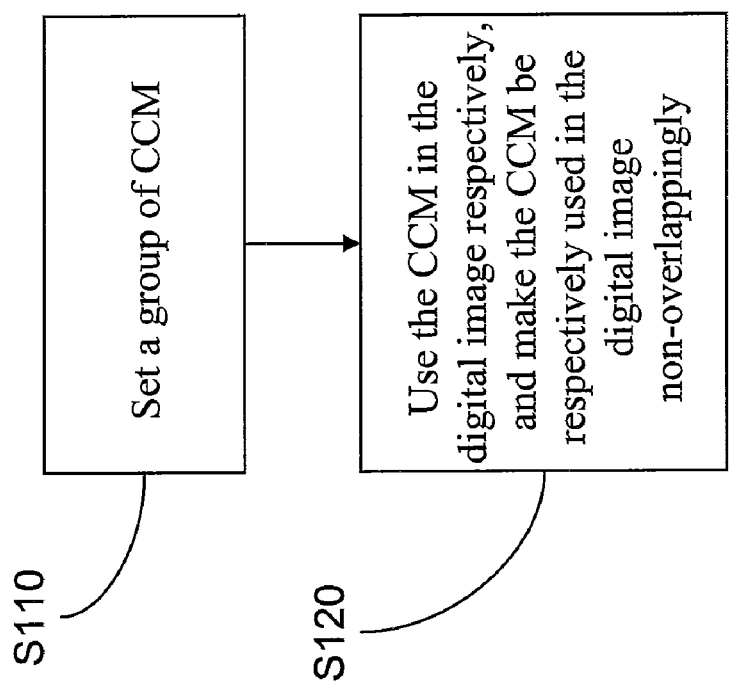
FIG. 1 is a schematic view of an architecture in the conventional art.
Figure 2A:
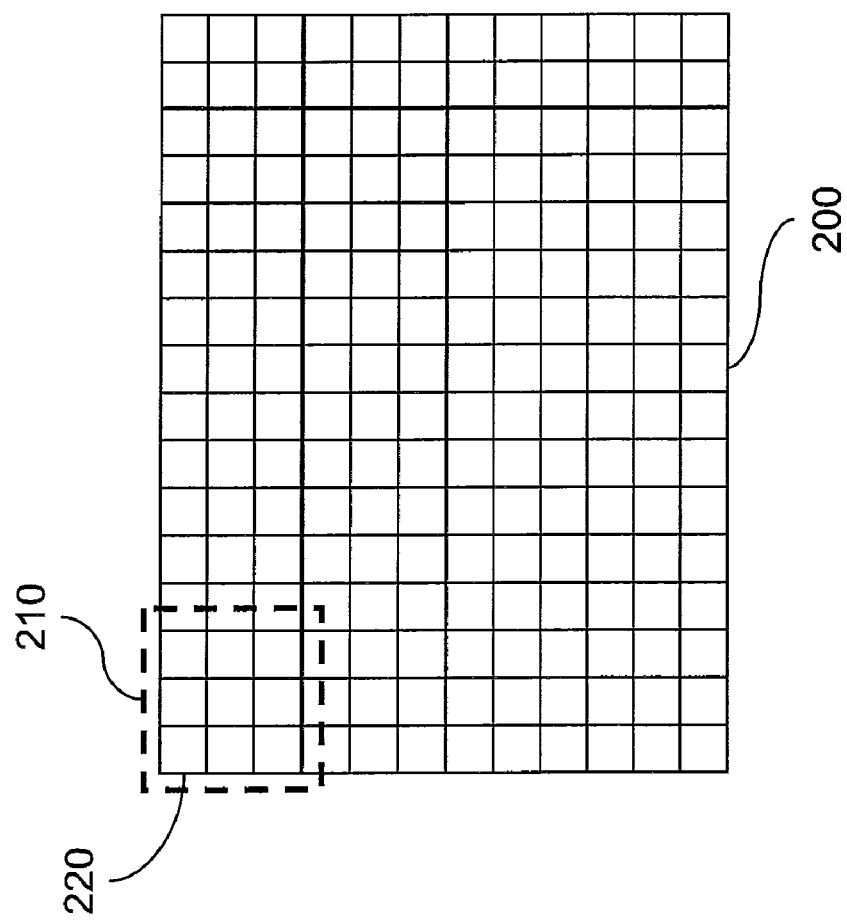
FIG. 2a is a schematic view of a digital image after being processed by CCM in the conventional art.
Figure 2B:
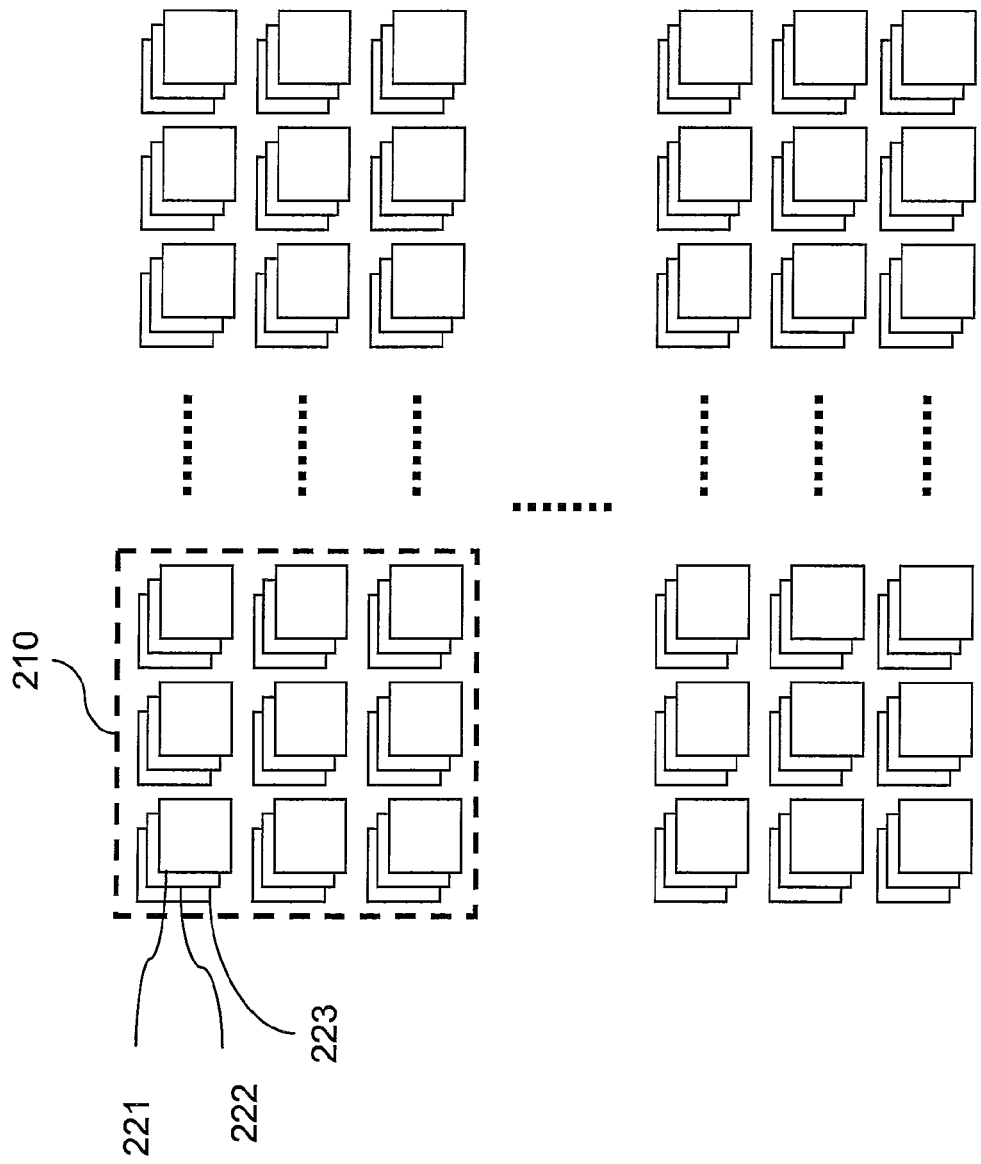
FIG. 2b is a schematic view of a digital image after being processed by CCM in the conventional art.
Figure 2C:
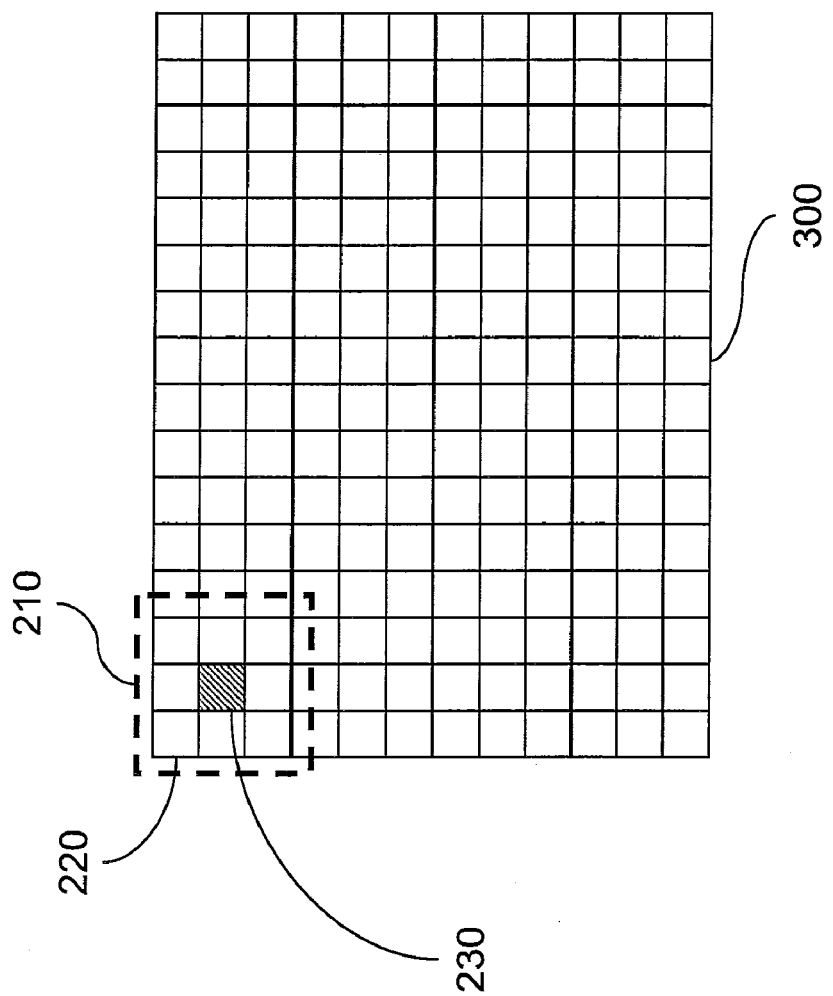
FIG. 2c is a schematic view of a pixel value after the color correction in the conventional art.
Figure 3:
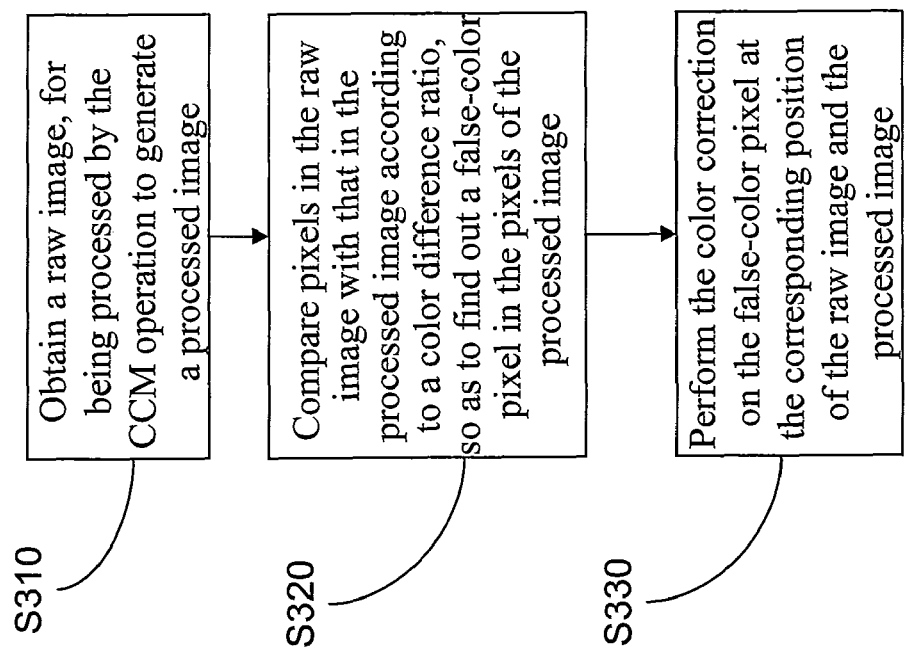
FIG. 3 is a schematic view of a false color correction flow according to the present invention.

In the present invention, the digital image with false color is corrected through a computer. Referring to FIG. 3, it is a schematic view of a false color correction flow according to the present invention. The method of correcting the false color provided by the present invention includes the following steps: obtaining a raw image, for being processed by the CCM operation to generate a processed image (Step S310). The raw image refers to a digital image that is not processed. Next, the raw image is processed by the color correction process through the CCM, so as to generate a corresponding processed image.

Next, according to the color difference ratio, the pixels of the raw image are compared with that of the processed image, so as to find out the false-color pixel in the pixels of the processed image (Step S320). In the image difference comparison, a matrix with a pixel size of x*y is used for respectively inspecting whether the false-color pixel occurs in each matrix of the digital image.

The color difference ratio of each pixel value at the corresponding position of the raw image is compared with that of the processed image, which is performed through the RGB three primary color value of the RGB color field in this embodiment. Besides the above RGB color field, a YCbCr color field may also be used for the color difference ratio comparison. If the pixel at the corresponding position of the raw image is much too different from the processed image according to the color difference, it represents that one pixel is the false-color pixel.

The color correction is performed on the false-color pixel at the corresponding position of the raw image and that of the processed image according to Equation 2 (Step S330).

$$Pixel_{img3} = m*Pixel_{img1} + n*Pixel_{img2} \quad \text{Equation 2}$$

$Pixel_{img1}$ is a pixel of the raw image, $Pixel_{img2}$ is a pixel of the processed image, $Pixel_{img3}$ is an output pixel, and m+n=1, m≧0, n≧0. It should be noted that, besides a single pixel value, Pixel may also be pixel values with various colors.

Figure 4:
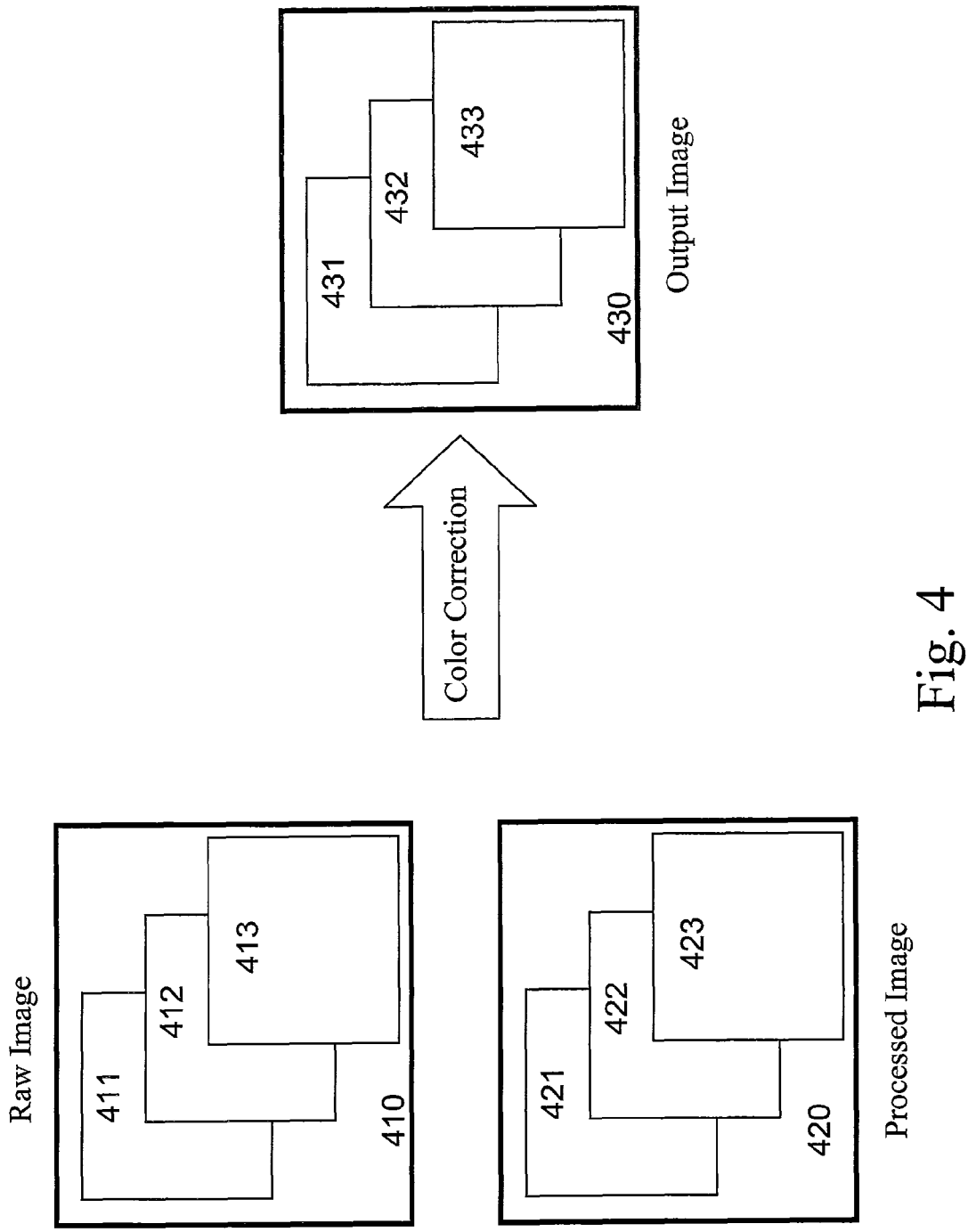
FIG. 4 is a schematic view of a false-color pixel correction according to the present invention.

Referring to FIG. 4, it is a schematic view of a false-color pixel correction according to the present invention. According to the position of a false-color pixel 420 generated in the processed image, a pixel 410 at the same position is selected from the raw image. Then, the color correction is performed on the color component of the pixel 410 in the raw image and the color component of the false-color pixel 420. Finally, each obtained color component is re-combined into a display pixel 430 of an output image. The color components of the pixel 410 in the raw image are respectively a red pixel 411, a green pixel 412, and a blue pixel 413. The color components of the false-color pixel 420 are respectively a red pixel 421, a green pixel 422, and a blue pixel 423. The color components of the display pixel 430 in the output image are respectively a red pixel 431, a green pixel 432, and a blue pixel 433.

Figure 5:
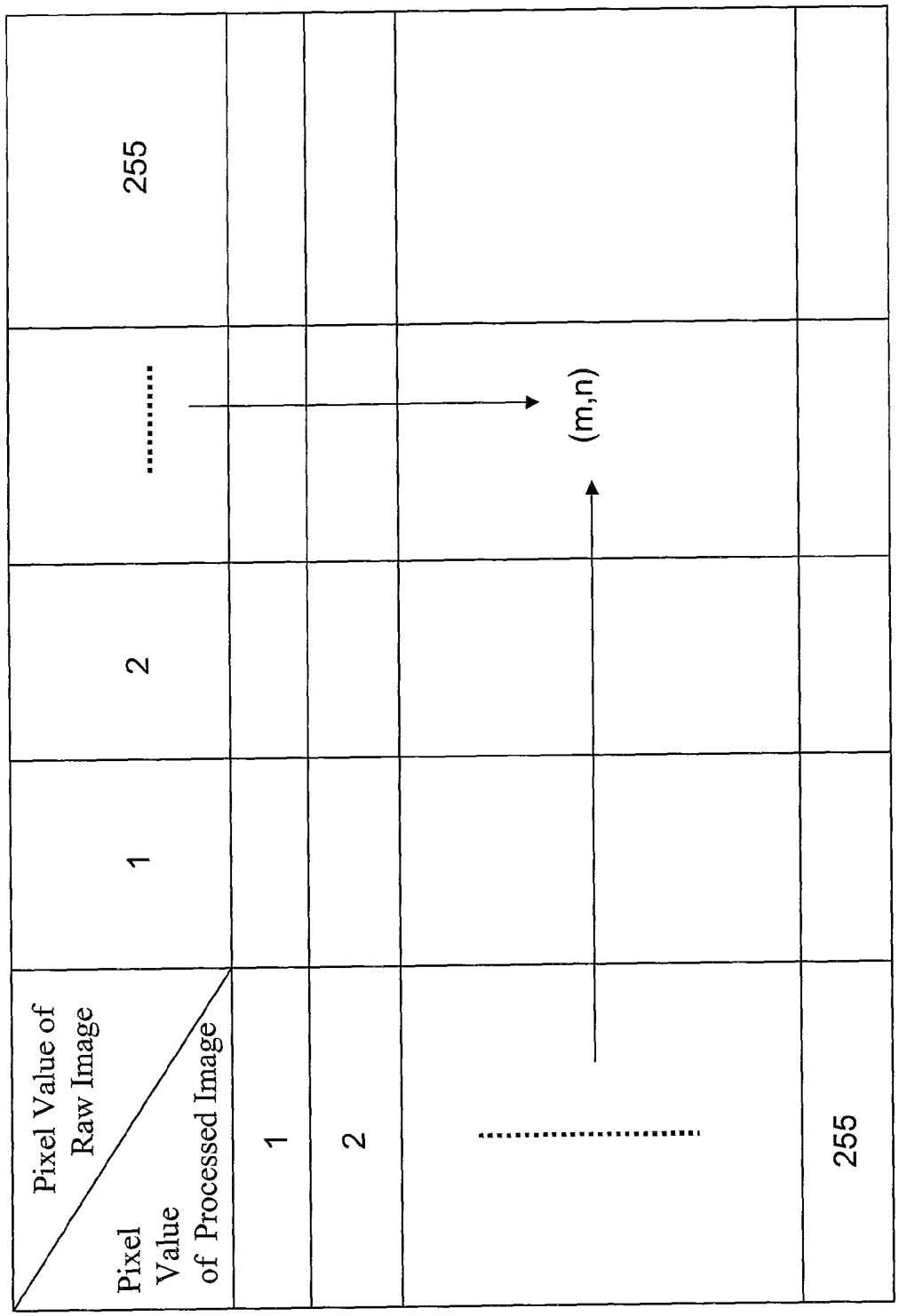
FIG. 5 shows a color distribution look-up table and a color distribution curve.

In the color correction process, a value m corresponding to the raw image and a value n corresponding to the processed image are looked up according to a color distribution look-up table, and according to the pixel color difference ratio between the raw image and the processed image, a value m corresponding to the raw image and a value n corresponding to the processed image are looked up. The sum of m and n is 1, which indicates that one proportion adjustment is performed on the pixel of the raw image and the false-color pixel. Since each color component is not equivalent for the visual display, if the same adjustment value is given to each color component, the color difference after the correction will become even larger. Referring to FIG. 5, it shows a color distribution look-up table and a color distribution curve.

If the color of the false-color pixel is directly charged to the color of the corresponding pixel in the raw image, the color difference with the pixels there around may easily become large, so as to result in distinct visual difference. Therefore, in the present invention, the pixels at the corresponding position of the raw image and the processed image are used, and the two colors are mixed according to a corresponding ratio looked up through the above manner, thereby obtaining a color matching with the neighboring colors.

Furthermore, the processing as indicated in Equation 2 may be performed on the display component of the display color field for the false-color pixel 420. The color difference ratio is compared through using the RGB three primary color value of the RGB color field, which further includes the following steps: making the false-color pixel of the processed image to generate a corresponding red pixel 421, a corresponding green pixel 422, and a corresponding blue pixel 423; performing the color correction on the red pixel 421 of the false-color pixel and the red pixel 411 of the raw image respectively; performing the color correction on the green pixel 422 of the false-color pixel and the green pixel 412 of the raw image; and performing the color correction on the blue pixel 423 of the false-color pixel and the blue pixel 413 of the raw image.

Here, the red pixel 421 of the false-color pixel is taken as an example for being adjusted. It is assumed that, if the red pixel 411 for the pixel in the raw image is 100, the red pixel 421 in the false-color pixel is 150. The color distribution look-up table is used to find out a difference ratio between the color of the raw image and the false-color pixel value, and the corresponding value m and value n are looked up from the table. Simply, the red value of the false color is larger than that of the raw image, so the value m is larger than the value n in the adjusted raw image. It is assumed that, if the obtained value m is 0.7, the value n is 0.3. An output pixel value is calculated according to Equation 2, and the finally obtained results are shown in the following equation.

$$0.7*100+0.3*150=115 \quad \text{Equation 3}$$

If the processing of Equation 2 is performed through the display component of the YCbCr color field, the following steps are included: making the pixel of the processed image generate a corresponding brightness component, a corresponding blue chromaticity component, and a corresponding red chromaticity component; performing the color correction on the brightness component; performing the color correction on the blue chromaticity component; and performing the color correction on the red chromaticity component.

The present invention provides a correction process on the false-color pixel of the digital image, for performing a false-color pixel correction on the digital image with the false-color pixel after being processed by the CCM. The false-color pixel is corrected according to the pixel color at the corresponding position of the raw image. After the correction process, the color of the pixel may be further similar to the pixel color of the raw image, without affecting the colors of the other pixels of the digital image.

What is claimed is:

1. A method of correcting a false-color pixel in a digital image, for correcting a false-color pixel generated after being processed by a color correction matrix (CCM), comprising:

obtaining a raw image (img1), for being processed by a color correction process through a CCM, so as to generate a processed image (img2), wherein during the color correction process, a value m corresponding to the raw image and a value n corresponding to the processed image are looked up through a look-up table according to a color difference ratio between pixels of the raw image and that of the processed image;

comparing the pixels of the raw image with that of the processed image according to a color difference ratio, to find out a false-color pixel in the pixels of the processed image; and performing a color correction on the false-color pixel at the corresponding position of the raw image and the processed image according to an equation as follows:

$$Pixel_{img3} = m*Pixel_{img1} + n*Pixel_{img2},$$

wherein $Pixel_{img1}$ is a pixel of the raw image, $Pixel_{img2}$ is a pixel of the processed image, $Pixel_{img3}$ is an output pixel, and m+n=1, m≧0, n≧0.

2. The method of correcting a false-color pixel in a digital image as claimed in claim 1, wherein the CCM is a 3*3 pixel matrix, and a pixel matrix with a corresponding size is selected from the raw image to perform the color correction with the CCM.

3. The method of correcting a false-color pixel in a digital image as claimed in claim 1, wherein the CCM is a 4*3 pixel matrix, and a pixel matrix with a corresponding size is selected from the raw image to perform the color correction with the CCM.

4. The method of correcting a false-color pixel in a digital image as claimed in claim 1, wherein the step of generating the processed image further comprises:
respectively selecting pixel matrixes with the corresponding size from the raw image non-overlappingly to perform the CCM operation.

5. The method of correcting a false-color pixel in a digital image as claimed in claim 1, wherein a color difference between the raw image and the processed image is determined according to a RGB color field.

6. The method of correcting a false-color pixel in a digital image as claimed in claim 5, wherein the step of executing the color correction further comprises:
making the pixels of the processed image generate a corresponding red pixel, a corresponding green pixel, and a corresponding blue pixel;
performing the color correction on the red pixel;
performing the color correction on the green pixel; and
performing the color correction on the blue pixel.

7. The method of correcting a false-color pixel in a digital image as claimed in claim 1, wherein a color difference between the raw image and the processed image is determined according to a YCbCr color field.

8. The method of correcting a false-color pixel in a digital image as claimed in claim 7, wherein the step of executing the color correction further comprises:
making the pixels of the processed image generate a corresponding brightness component, a corresponding blue chromaticity component, and a corresponding red chromaticity component;
performing the color correction on the brightness component;
performing the color correction on the blue chromaticity component; and
performing the color correction on the red chromaticity component.

* * * * *